Dec. 14, 1943.     J. R. HICKS     2,336,933
SHEET SECURING AND RETAINING DEVICE
Filed Oct. 6, 1941

INVENTOR.
JAMES R. HICKS
BY
E.C. Sanborn
Attorney

Patented Dec. 14, 1943

2,336,933

UNITED STATES PATENT OFFICE 2,336,933

SHEET SECURING AND RETAINING DEVICE

James R. Hicks, Waterbury, Conn., assignor to The Bristol Company, Waterbury, Conn., a corporation of Connecticut Application October 6, 1941, Serial No. 413,768

1 Claim. (Cl. 234—75)

This invention relates to means for removably securing a perforated sheet or the like to a flat surface, and more especially to a chart arbor for recording instruments.

It is a further object of this invention to provide means adapted to the efficient securing and retaining of a record sheet or the like in operative relationship with the elements of a mechanism without the resort to removable parts.

It is a further object to provide such a device having a deformable element adapted to expand into operative engagement with an opening perforated in a sheet or chart to be so secured.

It is a further object to provide such a device which may be fabricated substantially of nonmetallic materials.

It is a further object to provide such a device which will be simple in construction, inexpensive to manufacture, easy to install and manipulate, ornamental in appearance, and durable in use.

While this invention is applicable to a wide variety of uses where an element of mechanism or a portion of flat material is to be secured in temporary engagement with a flat surface, it is described herein in its especial application to the securing of a record sheet to the chart-driving element of a recording instrument of the circular-record type.

The conventional form of circular-chart recording instrument comprises a spindle which is driven, usually at a constant speed, by a clock or other timing mechanism. Carried by this spindle is an arbor having a projecting boss designed to fit a corresponding opening pierced in the center of a record chart of paper or similar material. A clamping element in the form of a nut adapted to engage a threaded portion of the boss, or a lever element, or similar mechanism, is provided for the purpose of forcing the chart into definite engagement with the arbor whereby it will be positively rotated therewith, and yet readily removable when the record is completed.

Typical mountings of these types are fully set forth and described in U. S. Letters Patent No. 1,478,861, dated December 25, 1923 and U. S. Letters Patent No. 2,155,817, dated April 25, 1931, both issued to applicant's assignee. These and other chart mountings are usually fabricated entirely of metal, embodying a considerable number of parts, and requiring more or less precision machine work in their construction.

Figure 1:
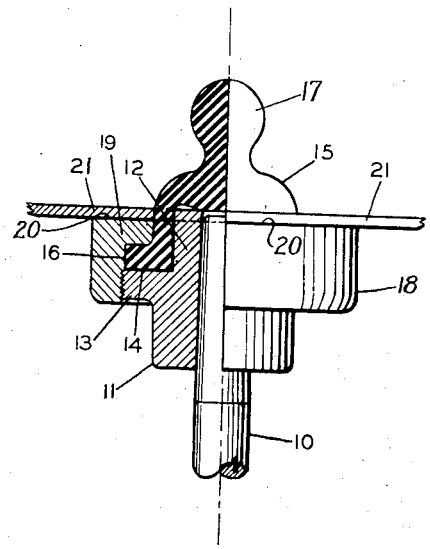
Fig. 1 is a view, partially in section, of a chart arbor embodying the principles of the invention, and having a record chart secured thereto.

Referring now to the drawing:

The numeral 10 designates a slightly tapered spindle such as commonly forms a part of the timing element of a recording instrument of the circular chart type. Mounted upon the spindle 10 is a hub element 11 formed either of metal or of a rigid plastic such as "Bakelite," and having a tapered interior bore to fit the spindle 10 whereby said hub element may be truly centered and caused to rotate with the spindle. The hub element 11 includes a projecting and slightly tapered boss 12 and a threaded flange part 13, having a flat annular surface portion 14. The outside diameter of the flange 13 and of the surface 14 is made considerably greater than that of the central opening in the chart with which it is desired that the arbor be used.

A deformable dome-shaped member 15, formed of rubber or other similarly resilient material, is provided with an internal surface to fit closely about the boss 12 of the hub element 11 and at its open end terminates in an annular flat surface to engage the corresponding surface 14 of said hub element. The outer surface of the member 15 is preferably formed to a slight conical taper and at part of its length axially removed from said flat surface has, when unstressed, a normal diameter slightly greater than the central opening in the chart with which the device is to be used.

The portion of the member 15 which includes the flat surface adaptable to engagement with the surface 14 is formed into a flange 16 of diameter substantially equivalent to that of the flange 13 and adapted to be pressed into intimate engagement therewith. The portion of the member 15 remote from the flange 16 is provided with a knob 17 which may conveniently be grasped with the fingers for stressing the member 15 in an axial sense.

Clamping of the flange 16 of the member 15 into intimate engagement with the surface 14 on the flange 13 is effected by means of a ring 18 having an inwardly projecting flange 19 bearing a flat annular surface adapted to be opposed to the surface 14 with the flange 16 interposed. An internally threaded portion on the ring 18 engages the thread on the flange 13, permitting the flange 16 of the member 15 to be securely gripped between the opposed flat annular surfaces. The ring 18 is provided with an annular plane surface 20 adapted to form a bearing for the chart 21 with which the device is to be used, and is also provided with an internal bore of diameter equal to, or slightly greater than, that of the opening in the chart.

Figure 2:
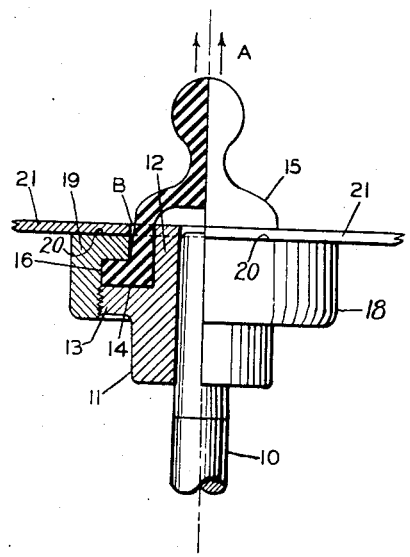
Fig. 2 is a similar view of the same in a position for placing or removing the chart.

The method of use of the chart arbor is as follows: when it is desired to place a record sheet upon the arbor, a chart 21, having a centrally located opening of predetermined diameter, is placed over the dome-shaped resilient member 15, the knob 17 grasped with the fingers and the element 15 placed under a certain degree of tension as indicated by the arrows A, Fig. 2. This will stretch the material of the side walls of the member 15 with a corresponding slight decrease in diameter throughout its length, as indicated at B in Fig. 2. The chart 21 may then be slipped over the member 15 into intimate engagement with the annular surface 20 of the clamping ring 18. Upon release of the knob 17, the natural resiliency of the member 15 will cause it to resume its former shape, the normal expansion of the side walls increasing the overall diameter to an extent that both the central opening in the chart 21 and the bore of the ring 18 are fully engaged by said member 15. The edge of said central opening in the chart is thus firmly gripped by said member 15, so that the chart is thereby clamped in its operating position as shown in Fig. 1. When it is desired to remove the chart, it is necessary only to apply a slight tension on the knob 17, stretching the element 15, and decreasing its diameter sufficiently to allow the chart to slip freely off the arbor.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

In a recording instrument having a shaft adapted to rotate a centrally perforated circular chart, the combination of a hub member secured to said shaft, an annular member adapted to be secured to said hub in clamping relationship, and having a face portion for supporting said chart, a resiliently extensible element adapted when in an extended condition to pass freely into the perforation in said chart but when not so extended to grip the interior edge of said perforation, said hub member and said annular member having cooperating portions in overlapping relation for clamping engagement with a portion of said extensible element at one side of said chart, said extensible element projecting beyond said members, and having at its free end a knob portion adapted to be grasped by an operator to extend said element.

JAMES R. HICKS.